United States Patent [19]
Pleso

[11] Patent Number: 5,859,970
[45] Date of Patent: Jan. 12, 1999

[54] PORTABLE COMPUTER WITH INTERNAL ETHERNET/TOKEN RING CONTROLLER

[75] Inventor: Mark F. Pleso, Sharon, Pa.

[73] Assignee: Telxon Corporation, Akron, Ohio

[21] Appl. No.: 703,739

[22] Filed: Aug. 27, 1996

[51] Int. Cl.$^6$ .............................. G06F 13/00; G06F 13/14
[52] U.S. Cl. ................................. 395/200.8; 395/200.58; 395/200.83; 455/403; 370/338
[58] Field of Search ................... 395/200.8, 575, 395/500, 200.5, 200.54, 200.58, 200.6, 200.83; 455/403, 422; 370/338, 340, 401

[56] References Cited

U.S. PATENT DOCUMENTS

| | | | |
|---|---|---|---|
| 5,218,187 | 6/1993 | Koenck et al. | 235/275 |
| 5,331,136 | 7/1994 | Koenck et al. | 235/275 |
| 5,497,460 | 3/1996 | Bailey et al. | 395/183.15 |

OTHER PUBLICATIONS

U.S. Publication PC Week, "The Pepsi Challenge"; Laura B. Smith, p. E1, Sep. 18, 1995.
U.S. Publication LAN Times, "New Way to Network your Notebook"; Tom Stearns, p. 232, May 22, 1995.
U.S. Publication PC Magazine, "Make your Notebook a Network Node"; Stephen Satchell, H.B.J. Clifford, Jan. 24, 1995.
Two pages from a catalog of Printed Circuit Board Connectors published by AMP Inc. of Harrisburg, PA, publication date Jul. 1995.

*Primary Examiner*—Frank J. Asta
*Assistant Examiner*—Ivan C. Pierce, III
*Attorney, Agent, or Firm*—Renner, Otto, Boisselle & Sklar, P. L.L.

[57] ABSTRACT

A portable electronic device including a portable housing; electronic circuitry within the housing, the electronic circuitry being operable to perform functions independent of and in combination with a system backbone including at least one of an Ethernet backbone and a Token Ring backbone; and an internal area network (LAN) controller within the housing for serving as an interface between the electronic circuitry and the system backbone.

20 Claims, 5 Drawing Sheets

5,859,970

PORTABLE COMPUTER WITH INTERNAL ETHERNET/TOKEN RING CONTROLLER

TECHNICAL FIELD

The present invention relates generally to portable electronic devices such as portable computers (e.g., laptop or notebook computers) and mobile data terminals. More specifically, the present invention relates to portable devices which include an internal Ethernet or Token Ring network controller.

BACKGROUND OF THE INVENTION

In recent years, the use of portable electronic devices to gather, store and/or process information has become increasingly popular. Portable devices are sized such that a user can easily carry the devices to different locations. For instance, portable computers permit users to conduct word processing, computations, spreadsheet analysis, etc. while traveling or at remote locations. Personal data assistants (PDAs) allow users to store electronically personal and business information in an organized fashion. Such information may be subsequently downloaded to a main database. Retail stores and warehouses often use portable data gathering devices (e.g., mobile data terminals or simply "mobile terminals") in order to keep track of inventory or replenish stock. Furthermore, such portable devices are often used by delivery personal and insurance inspectors to gather data at field locations in order to reduce the amount of paper which is utilized and to increase efficiency in recording data.

As for information which is stored in the portable devices, oftentimes it is desirable to transfer such information eventually to a network host computer, a printer and/or a main storage device. For example, inventory data stored within a plurality of different mobile terminals can be transferred to a central computer which processes the data to determine ordering information, etc. Such transfer of information is usually carried out in either of two ways. One way is to connect the portable device directly to a local area network (LAN) supporting a host computer and other devices so as to form a direct physical path through which the information is transferred. Another, and increasingly popular, method of transferring the information is to equip the portable devices with wireless transceivers through which the portable devices can remain in wireless contact with devices connected to the LAN.

Nevertheless, even portable devices which support wireless transfer are often physically connected to the LAN via a docking station for purposes of obtaining high speed transfer of information. As an example, a mobile terminal may need to upload or download large information files to/from a host computer or printer connected to the LAN. Such large files can take an unacceptably long period of time if such information were to be transferred via a wireless transceiver. Typical wireless data transmission rates for commercial mobile terminals are on the order of 1 Mbps compared to approximately 10 Mbps available with a direct physical connection to the LAN.

In order to allow for direct communication between a portable device and a LAN, special processing of the information is necessary to convert the data into a format capable of being transmitted and received over the LAN. Such special processing is typically carried out by a circuit referred to as a network interface or network controller. Currently, network controllers for such portable devices are often in the form of a PCMCIA card. Upon inserting such a PCMCIA card into the portable device, a user is required to re-boot the portable device in order to initialize properly and activate the network controller. In addition, the user is required to connect the PCMCIA card to the LAN via a telephone plug type jack.

Unfortunately, the use of a PCMCIA card to serve as a network controller for interfacing the circuitry within the portable device with the LAN has several disadvantages. For instance, PCMCIA cards are very thin and combining a telephone sized jack with the card often involves special connections which are delicate in nature and prone to breaking. Also, as is mentioned above the user must re-boot the portable device in order to initialize and activate the network controller. This presents a burden on the user as it typically requires that the user save all open files and/or close any open applications running on the portable device prior to rebooting. The user must then wait for the rebooting process to be completed.

Furthermore, the PCMCIA card occupies a slot in the portable device at least during such time as the device is connected to the LAN. As a result, other peripheral PCMCIA devices such as modems, wireless transceivers, etc. are prevented from occupying the same slot during such times.

In view of the aforementioned shortcomings with portable devices, there is a strong need in the art for a portable device which can be connected more readily to a LAN. More particularly, there is a strong need in the art for a portable device and method which does not require connection of the portable device to a LAN controller prior to connection to the LAN. Furthermore, there is a strong need in the art for such a portable device and method which does not require that the device be rebooted upon being physically connected to the LAN.

SUMMARY OF THE INVENTION

A portable electronic device is provided which includes an internal LAN controller for interfacing the device with a LAN. The portable device does not require connection to a peripheral LAN controller and can be readily coupled to an Ethernet or Token Ring system backbone. In the preferred embodiment, the portable device electrically connects to the system backbone via a docking station designed to receive the portable device. The portable device includes an electrical connector configured to provide an electrical connection with a corresponding electrical connector in the docking station that is coupled to the system backbone. Upon detecting power received by the portable device from the docking station, the portable device automatically switches the LAN controller within the device from a low-power consumption sleep mode to an active mode. Thereafter, the electronic circuitry within the portable device can communicate with the LAN via the LAN controller without the need to reboot the portable device.

According to one particular aspect of the invention, a portable electronic device is provided which includes a portable housing; electronic circuitry within the housing, the electronic circuitry being operable to perform functions independent of and in combination with a system backbone comprising at least one of an Ethernet backbone and a Token Ring backbone; and an internal area network (LAN) controller within the housing for serving as an interface between the electronic circuitry and the system backbone.

In accordance with another aspect of the invention, a method is provided for using a portable electronic device which includes a portable housing;

electronic circuitry within the housing, the electronic circuitry being operable to perform functions independent of and in combination with a system backbone comprising at least one of an Ethernet backbone and a Token Ring backbone; and an internal area network (LAN) controller within the housing for serving as an interface between the electronic circuitry and the system backbone. The method includes the steps of determining whether the device is electrically connected to the system backbone; placing the LAN controller in an active mode in the event the device is electrically connected to the system backbone; and placing the LAN controller in a low-power consumption sleep mode in the event the device is not electrically connected to the system backbone.

According to yet another aspect of the invention, a method is provided for using a portable electronic device which includes a portable housing; electronic circuitry within the housing, the electronic circuitry being operable to perform functions independent of and in combination with a system backbone comprising at least one of an Ethernet backbone and a Token Ring backbone; and an internal area network (LAN) controller within the housing for serving as an interface between the electronic circuitry and the system backbone. The method includes the step of exchanging communications between the electronic circuitry and the system backbone via the LAN controller.

According to another aspect, a portable electronic device is provided which includes a portable housing; electronic circuitry within the housing, the electronic circuitry being operable to perform functions independent of and in combination with a system backbone comprising at least one of an Ethernet backbone and a Token Ring backbone; wherein the electronic circuitry includes a local area network (LAN) controller for serving as an interface between the electronic circuitry and the system backbone.

In accordance with yet another aspect, a portable electronic device is provided which includes a portable housing; electronic circuitry within the housing, the electronic circuitry being operable to perform functions independent of and in combination with a system backbone comprising at least one of an Ethernet backbone and a Token Ring backbone; and a local area network (LAN) controller integrally coupled to said electronic circuitry for serving as an interface between the electronic circuitry and the system backbone.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
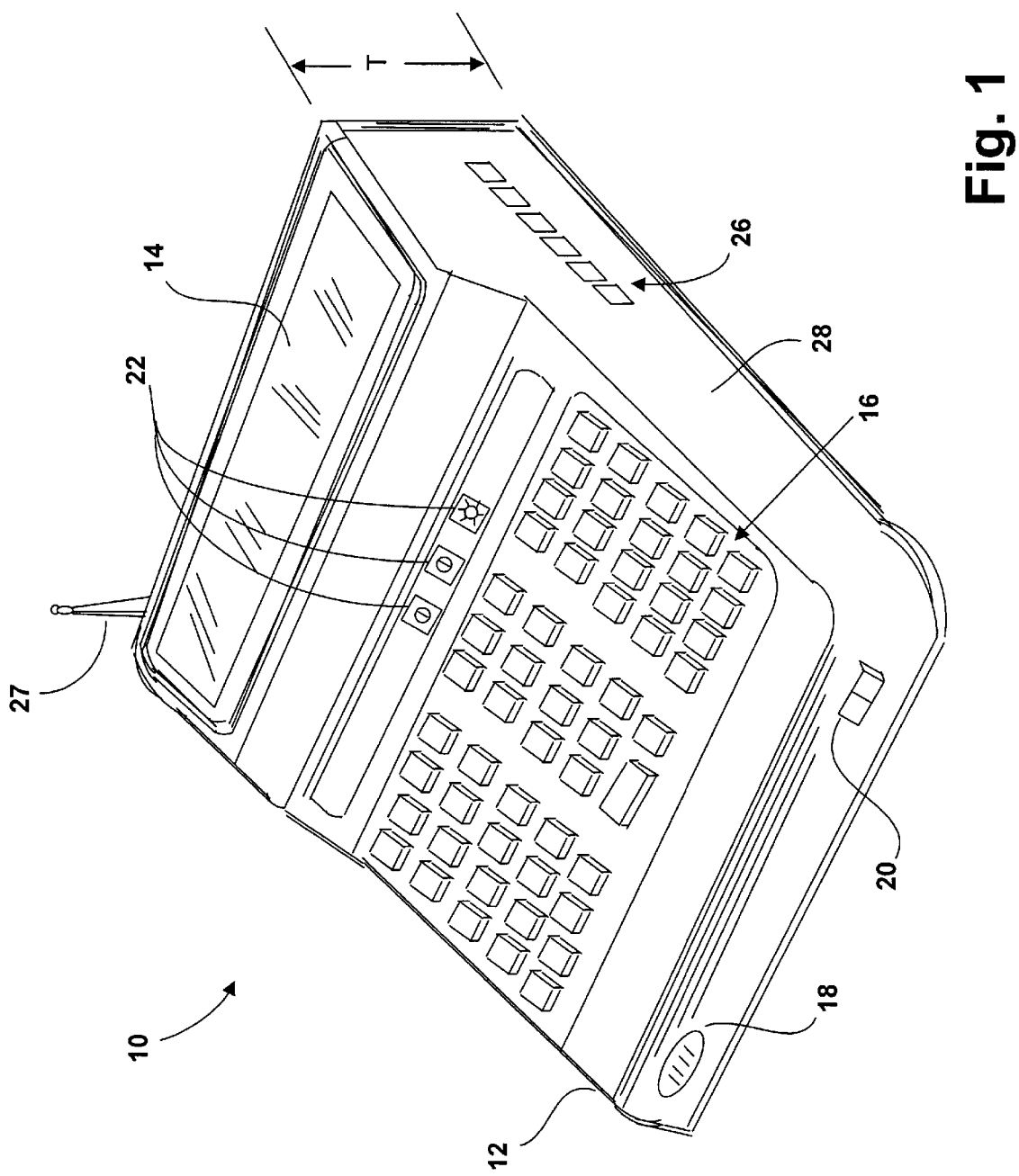
FIG. 1 is a perspective view of an exemplary portable device in accordance with the present invention.

The present invention will now be described with reference to the drawings, wherein like reference numerals are used to refer to like elements throughout.

Referring initially to FIG. 1, a portable electronic device in accordance with the present invention is generally designated 10. In the exemplary embodiment, the portable device 10 is a mobile terminal used in a wireless communication network for tracking inventory, storing data, etc. The user may input and/or process data via a keypad, bar code scanner, etc. independent of the portable device 10 being connected to a LAN, for example. The data is stored in memory within the portable device 10. When the portable device 10 is eventually connected to a LAN, the data can be transmitted onto the system backbone. It will be appreciated that the portable device 10 could also be any other device that is portable in nature and having electronic circuitry therein for performing user functions independent of whether the device is currently connected to a LAN. For example, the portable device 10 could be a laptop computer or notebook computer, a PDA, or even a cellular telephone or pager which may occasionally require physical connection to a LAN.

In this particular embodiment, the portable device 10 includes a portable housing 12, a display 14 for displaying information to the user, and a set of user interface keys 16 for allowing a user to input information and/or operational commands. The housing 12 is sized so as to be conveniently hand-carried by a user from location to location. The user interface keys 16 may include a full alpha-numeric keypad, function keys, enter key, etc. The portable device 10 also includes a window 1 8 through which a bar code reader (FIG. 2) is able to read a bar code label presented to the portable device. Also included in the portable device 10 is an ON/OFF power switch 20 for turning the device on and off. Furthermore, the portable device 10 includes status lights 22 for indicating to a user such things as operation of a memory hard drive, low battery power, low power consumption mode, etc. The portable device 10 also includes an antenna 27 which allows the portable device 10 to transmit and receive data via an RF link to a wireless communication network.

The portable device 10 further includes an electrical connector 26 exposed at an edge 28 of the housing 12. As is described more fully below in connection with FIGS. 3 and 4, the electrical connector 26 includes a set of six electrical contacts. Four of the electrical contacts are used for communications between the electronic circuitry within the portable device 10 and a LAN system backbone (not shown). The remaining two of the electrical contacts are used for providing power from an external power source to the portable device 10. Such external power is used to provide operating power to the portable device 10 and/or to recharge a battery within the portable device as is discussed below. Preferably the contacts in the connector 26 are made of stainless steel so as to resist corrosion.

Figure 2:
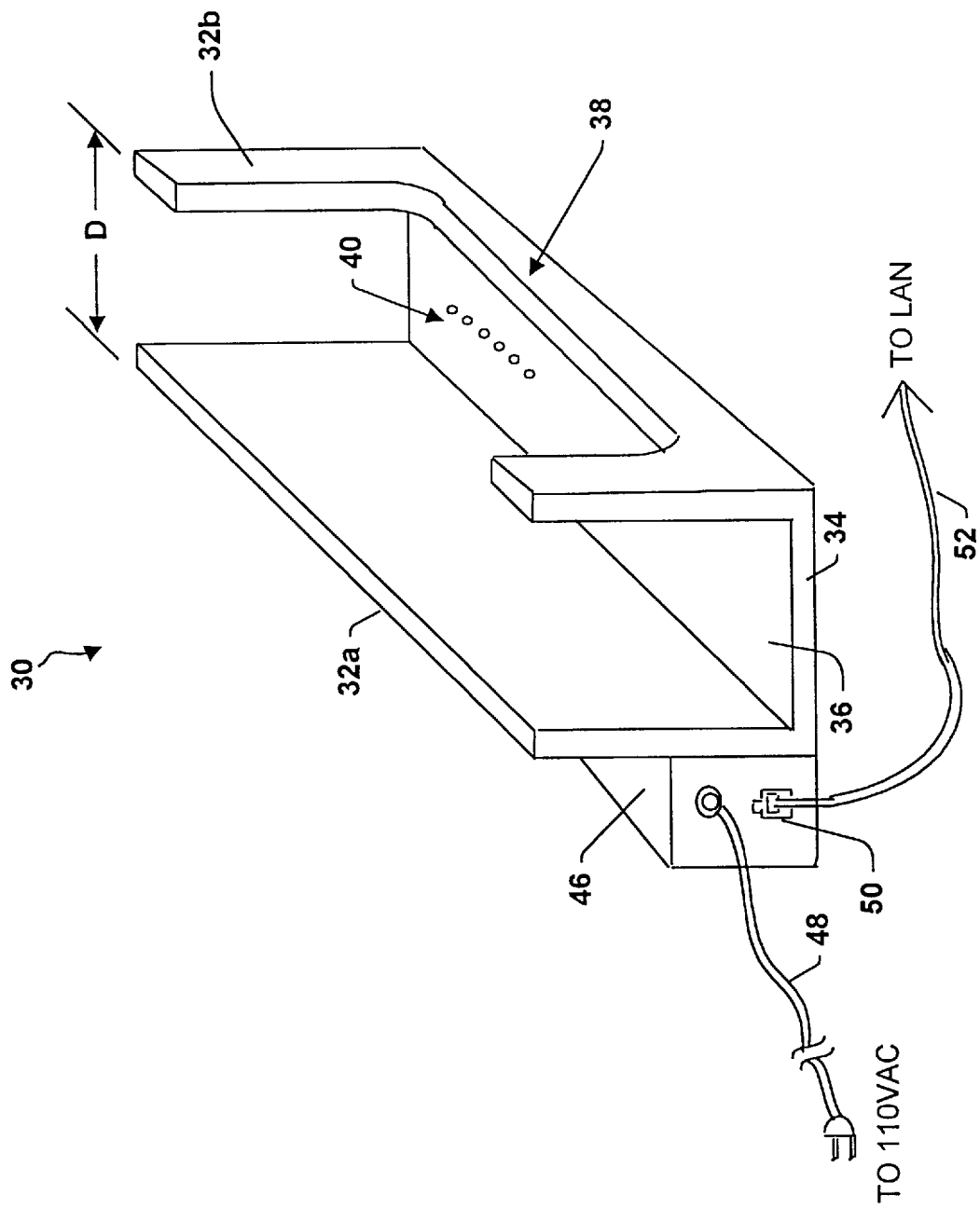
FIG. 2 is a perspective view of a docking station configured to receive the portable device of FIG. 1 in accordance with the present invention.

FIG. 2 illustrates a docking station 30 for use in conjunction with the portable device 10. The docking station 30 includes side walls 32a and 32b extending vertically from a base member 34. The side walls 32a and 32b are spaced apart by a distance D which is slightly larger than the thickness T of the portable device 10. Consequently, the docking station 30 is designed to receive the portable device 10 as a result of the portable device 10 being turned on its side with the edge 28 facing downward. The edge 28 is inserted between the side walls 32a and 32b until the edge 28 comes into contact with the top surface 36 of the base member 34. The side walls 32a and 32b then maintain the portable device 10 in such an upright position while the edge 28 is flush with the surface 36 of the base member 34. It is noted that the side wall 32b includes a cut out 38 to provide continued access to the user interface keys 16 even while the portable device 10 is docked at the docking station 30.

As shown in FIG. 2, the base member 34 includes a connector 40 designed to correspond to the connector 26 located on the edge 28 of the portable device 10. Like the connector 26, the connector 40 includes a set of six electrical contacts. Four of the electrical contacts are used for communications between the electronic circuitry within the portable device 10 and a LAN system backbone (not shown). The remaining two of the electrical contacts are used for providing external power to the portable device 10. The contacts of the connector 40 are positioned in the base member 34 so as to align with the corresponding contacts of the connector 26 when the portable device 10 is inserted or "docked" in the docking station. In addition, each of the contacts in the connector 40 are spring loaded so as to urge the contacts into secure physical and electrical contact with the corresponding contacts in the connector 26. The weight of the portable device 10 standing on its edge 28 helps to further ensure satisfactory contact between the connectors 26 and 40.

The docking station 30 also includes a power supply/LAN connector module 46 attached to the exterior of the side wall 32a. As is described more fully below with respect to FIG. 4, the module 46 includes a power converter for providing power to the portable device 10 via the connector 40. The module 46 receives power via a conventional power cord 48 which plugs into a standard 110 VAC outlet, for example. The module 46 also includes a connector jack 50 for receiving a cable 52 which connects the docking station 30 to a LAN system backbone. According to the preferred embodiment, the LAN system backbone to which the cable 52 is coupled is either an Ethernet or Token Ring configuration, and permits communications according to corresponding protocols.

Figure 3:
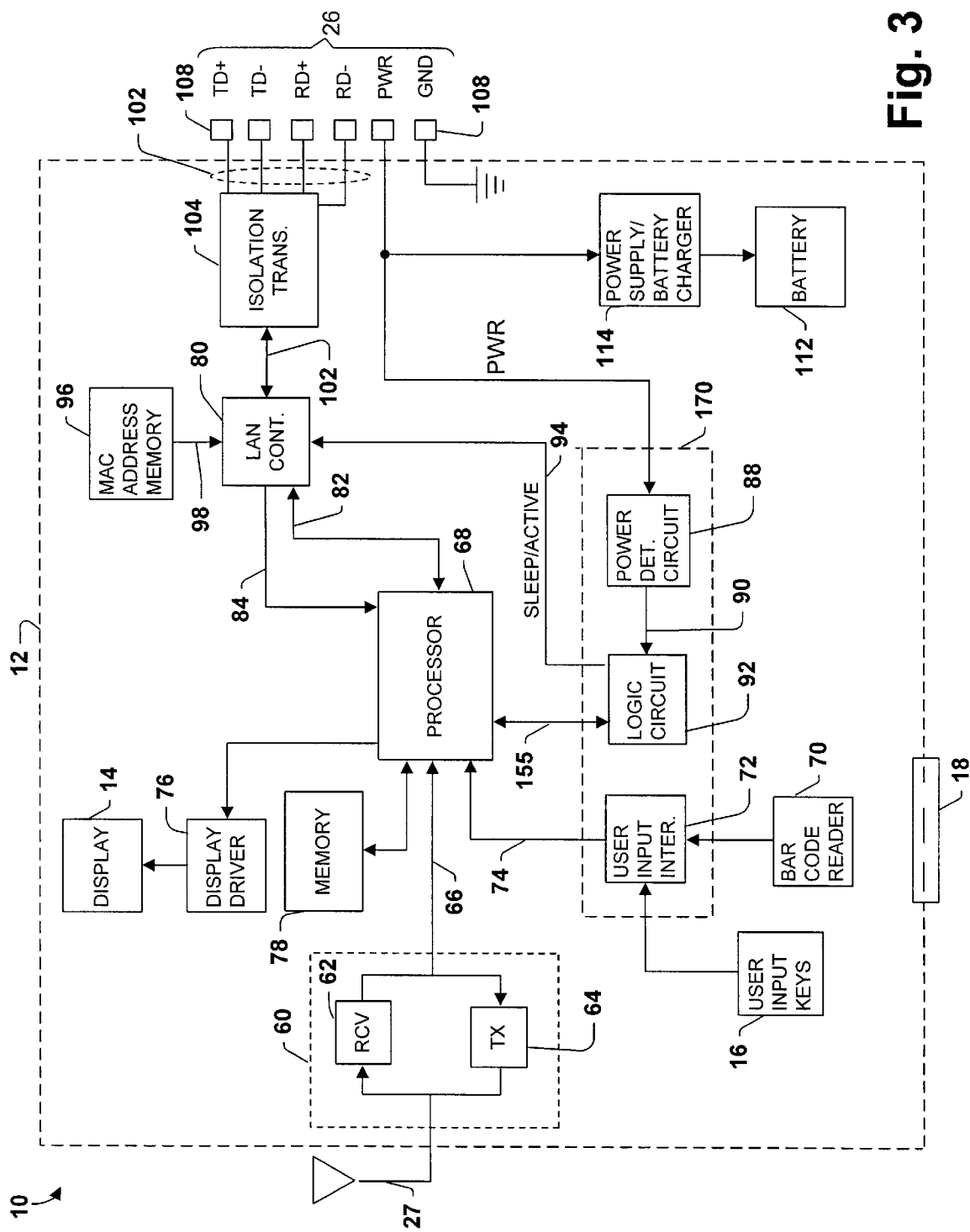
FIG. 3 is a block diagram of the portable device in accordance with the present invention.

Turning now to FIG. 3, a detailed block diagram of the electronic circuitry within the portable device 10 is shown. As is noted above, the portable device 10 includes an antenna 26 for receiving and transmitting radio signals in connection with operation of the portable device with a wireless communication network. The antenna 26 is connected to an RF section 60 which includes a radio receiver 62 and a radio transmitter 64 for receiving and transmitting data, respectfully. The RF section 60 is coupled via a bus 66 to a processor 68 included in the portable device 10. The processor 68 is responsible for controlling overall operation within the portable device 10. For example, the processor 68 controls the operation of the portable device 10 with respect to processing and storing information (e.g., inventory data) input by a user via the input keys 16, the bar code window 18, etc. In addition, the processor 68 controls the operation of the RF section 60 with respect to information received and transmitted by the RF section 60 in relation to a wireless communication network. Generally speaking, the processor 68 is programmed to control and to operate the various components within the portable device 10 in order to carry out the various functions described herein.

The portable device 10 includes a bar code reader 70 positioned within the housing 12 adjacent to the window 18 for reading bar code labels presented to the portable device 10. The bar code reader 70 and the aforementioned user input keys 16 are coupled to the processor 68 via a user input interface 72. The user input interface 72 performs any conventional conditioning of the output signals from the bar code reader 70 and the input keys 16 as may be appropriate so that they may be received by the processor 68 via line 74.

The display 14 is also connected to and controlled by the processor 68 via a display driver circuit 76 as is conventional. The display 14 can be a flat panel liquid crystal display with alphanumeric capabilities, for example, or any other type of display as will be appreciated.

A memory 78 is included in the portable device 10 for storing program code executed by the processor 68 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for sake of brevity. The memory 78 also serves as a storage medium for storing information input by the user and/or received from or transmitted by the RF section 60. The memory 78 may include both volatile and non-volatile memory, and may include a hard drive or other high density storage medium.

As is discussed above, oftentimes it may be desirable to transfer information from the portable device 10 to a LAN directly, or vice versa, via a physical connection. For example, it may be desirable that the processor 68 transfer user information stored in the memory 78 to the LAN. Accordingly, the portable device 10 of the present invention includes an internal LAN controller 80 located within the housing 12. According to the exemplary embodiment, the LAN controller 80 is an integrated circuit which resides for example on the same printed circuit board as one or more of the other components shown in FIG. 3. The LAN controller 80 serves as an interface between the processor 68 and the remainder of the portable device 10 and the LAN. The protocol by which the LAN controller 80 serves as an interface for transmissions between the portable device 10 and the LAN follows conventional Ethernet or Token Ring protocols, depending on whether it is an Ethernet or Token Ring LAN.

The LAN controller 80 is, for example, an Ethernet type controller such as Ethernet LAN controller Model No. CS 8900-CQ which is commercially available from Crystal Semiconductor in Austin, Tex., U.S.A. The LAN controller 80 is coupled to the processor 68 via lines 82 and 84. Line 82 represents an ISA or local bus connection to the LAN controller 80, while line 84 represents an interrupt request line for indicating to the processor 68 that processing is required. Preferably the LAN controller 80 is of the type which can be controllably switched between an active mode and a low-power consumption sleep mode. For example, the aforementioned LAN controller Model No. CS 8900-CQ can be selectively placed in either an active mode or a low-power sleep mode by virtue of a control signal provided to the LAN controller 80.

The present invention utilizes this feature to conserve power consumption in the portable device 10 during such times as the device 10 is not connected to the LAN. Specifically, the portable device 10 includes a power detection circuit 88 which, as is described more fully below, detects when external power is provided to the portable device 10 via the connector 26. The power detection circuit 88 provides an output on line 90 which is indicative of whether external power is currently provided to the portable device 10. The signal on line 90 is provided to a logic circuit 92 which produces a sleep/active control signal on line 94 based on the output of the power detection circuit 88. In particular, if the power detection circuit 88 provides an output on line 90 indicating that power is currently being provided to the portable device 10, the logic circuit 92 places the control signal on line 94 at a first logic level indicating an active mode. On the other hand, if the power detection circuit 88 provides an output on line 90 indicating that power is not currently being provided to the portable device 10, the logic circuit 92 places the control signal on line 94 at a second logic level indicating a low-power consumption (or "sleep") mode. The sleep/active control signal on line 94 is input to the LAN controller 80 so as to control whether the LAN controller 80 is in an active mode or a sleep mode based on the first and second logic levels, respectively.

Thus, even when the portable device 10 is not docked in the docking station 30 so as to receive external power therefrom, the LAN controller 80 still remains in a sleep mode rather than being completely powered down. As a result, the portable device 10 need not be rebooted each time it is docked into the docking station 30 unlike devices using a PCMCIA type LAN controller. In this manner, the present invention allows for hot docking of the portable device 10.

An electrically erasable programmable read only memory (EEPROM) 96 is connected to the LAN controller 80 and has stored therein the media access layer (MAC) address for the LAN controller 80. The MAC address is used by the LAN controller 80 when interfacing the portable device 10 to the LAN. The EEPROM 96 provides the MAC address to the LAN controller 80 by way of a data bus 98. Preferably the MAC address is programmed into the EEPROM 96 at the time of manufacture of the portable device 10. Different portable devices 10 can be programmed with different MAC addresses such that even when multiple devices 10 are connected to the LAN, information can be selectively addressed over the LAN to the individual devices 10.

The transmit and receive data lines for the LAN controller 80 are represented by line 102. Included in line 102 between the LAN controller 80 and the connector 26 is an isolation transformer 104. The isolation transformer 104 blocks low frequency DC voltages from being transferred between the portable device 10 and the LAN and allows data signals on line 102 to pass. As shown in detail on the right hand side of the isolation transformer 104 in FIG. 3, line 102 is made up of four different data lines TD+, TD−, RD+ and RD−. Lines TD+ and TD− are used by the LAN controller 80 to transmit data from the portable device 10 to the LAN. Lines RD+ and RD−, on the other hand, are used by the LAN controller 80 to receive data from the LAN. Thus, information from the LAN is received by the portable device 10 on lines RD+ and RD− via the connector 26 and is coupled through the isolation transformer 104 to the LAN controller 80. The LAN controller 80 then performs conventional processing on the data and transfers the received data to the processor 68 via line 82. In order to transmit information from the portable device 10 to the LAN, the processor 68 provides the information to the LAN controller 80 via line 82. The LAN controller 80 again performs conventional processing on the data and transmits the data onto lines TD+ and TD− and to the LAN via the connector 26.

As is shown in FIG. 3, each of the lines TD+, TD−, RD+ and RD− terminate at the connector 26 with an electrical contact 108 designed to engage a corresponding contact in the connector 40 of the docking station 30. Also included in the connector 26 are contacts 108 corresponding to power and ground lines PWR and GND, respectively, for receiving external power provided to the portable device 10. The line GND is connected to ground within the portable device 10. A suitable DC voltage for operating and/or recharging a battery within the portable device 10 is provided to the power line PWR relative to ground when the portable device 10 is docked in the docking station 30 in the manner discussed above. The power line PWR is connected as shown to an input of the aforementioned power detection circuit 88. Depending on whether the voltage on the power line PWR is zero (indicating the portable device 10 is not docked in the docking station 30 and connected to the LAN), or the voltage on the power line PWR is the DC voltage for operating and/or recharging a battery within the portable device 10 (indicating that the portable device 10 is docked and connected to the LAN), the power detection circuit 88 provides the appropriate output on line 90 indicating whether external power is applied to the portable device 10. As previously described, the logic circuit 90 in turn produces a sleep/active control signal on line 94 in order that the LAN controller 80 is placed in a sleep mode if external power is not provided on the power line PWR. Similarly, the logic circuit 90 produces a control signal on line 94 in order that the LAN controller 80 is placed in an active mode if external power is provided to the device 10 on the power line PWR.

The portable device 10 also includes a rechargeable battery 1 12 which provides operating power to all of the circuitry within the portable device 10 at least during such times as the portable device is not docked to the docking station 30. In addition, the portable device 10 includes a power supply/battery charger circuit 114 for receiving external power via the power line PWR. In the event external power is provided to the portable device 10 via the power line PWR, the power supply/battery charger 114 functions to supply such power to the various electrical components within the device 10 in place of power otherwise provided by the battery 112. In addition, the power supply/battery charger 114 functions to recharge the battery 112 using the external power. As a result, during such time as the portable device 10 is docked at the docking station 30 the external power is used to operate the device in order to conserve battery power. Moreover, such power can be used to recharge the battery 112.

Figure 4:
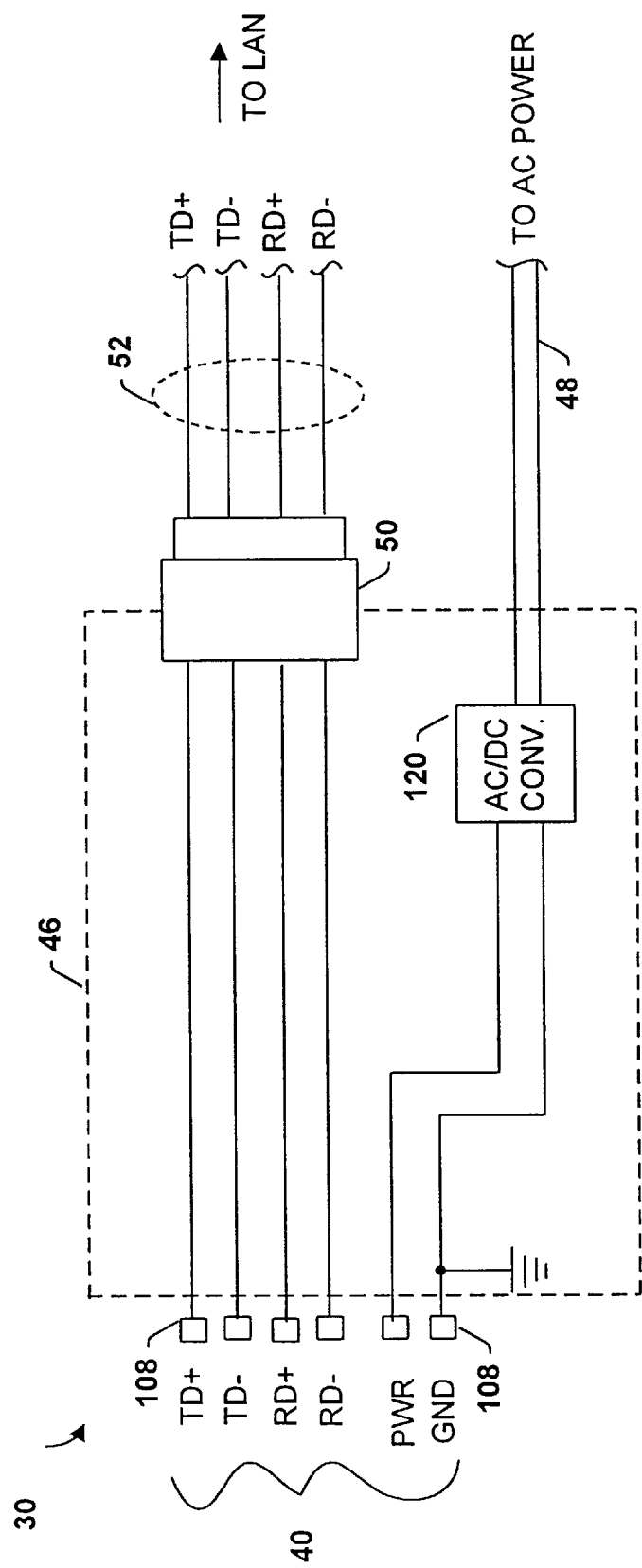
FIG. 4 is a block diagram of the docking station in accordance with the present invention.

Referring briefly to FIG. 4, a block diagram of the docking station 30 is shown. The connector 40, like the connector 26 of the portable device, includes electrical contacts 108 corresponding to lines TD+, TD−, RD+, RD−, PWR and GND. The contacts 108 are arranged such that when the portable device 10 is docked in the docking station 30, lines TD+, TD−,RD+, RD−, PWR and GND of the portable device 10 are engaged in electrical contact with lines TD+, TD−, RD+, RD−, PWR and GND of the docking station 30, respectively.

As is shown in FIG. 4, the lines TD+, TD−, RD+, RD− are coupled directly to the connector jack 50 in the module 46. Consequently, signals on lines TD+, TD−, RD+, RD− are connected directly between the docking station 30 and the LAN via cable 52. In addition, AC power which is provided to the docking station 30 via the power cord 48 is input to an AC/DC converter 120. The AC/DC converter 120 converts the AC power received via the power cord 48 to a suitable DC voltage which is provided to the power and ground lines PWR and GND, respectively. As a result, when the portable device 10 is docked in the docking station 30 the portable device 10 will receive external power from the PWR and GND lines of the docking station 30.

Figure 5:
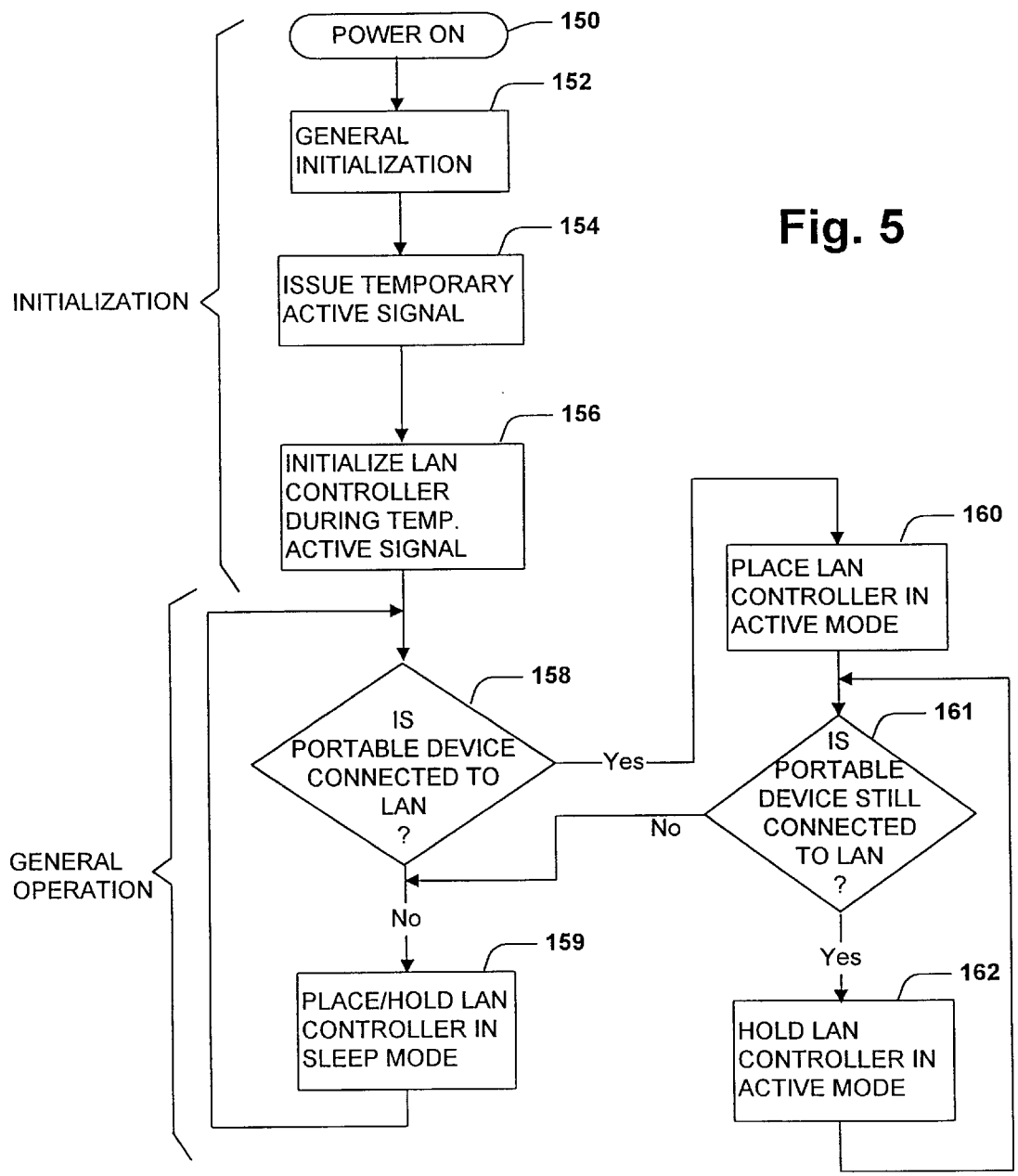
FIG. 5 is a flowchart representing the operation of the portable device in accordance with the present invention.

FIG. 5 is a flowchart representing the operation of the portable device 10 according to the present invention. In step 150, power is first applied to the portable device 10 by way of the user turning the switch 20 (FIG. 1) to the ON position. Next, in step 152 the processor 68 carries out any conventional initialization routines for initializing the circuitry within the portable device 10. Concurrently with or following step 152, the processor 68 in step 154 causes the logic circuit 92 to issue a temporary active signal on line 94. Such temporary active signal ensures that the LAN controller 80 is held in an active mode in order that it can be initialized properly upon the portable device 10 being turned on via the switch 20. In the exemplary embodiment, the processor 68 as part of its initialization routine issues a command on line 155 (FIG. 3) which causes the logic circuit 92 to provide a control signal on line 94 which keeps the LAN controller 80 in an active mode until such time as the LAN controller 80 itself is initialized.

Thus, following step 154 the LAN controller 80 is initialized in step 156. This involves loading the MAC address from the EEPROM 96 into the LAN controller 80. In addition, step 156 includes conventional initialization procedures such as the LAN controller 80 configuring appropriate interrupts, buffers, I/O drives, etc. Following step 156, the temporary active signal on line 94 is removed, placing the LAN controller 80 in a sleep mode, and the portable device 10 begins general operation beginning in step 158.

In step 158, the portable device 10 begins general operations such as providing for user input data, processing of inventory data, etc. In addition, however, the portable device 10 begins a routine to monitor continuously whether it is connected to the LAN. Specifically, the portable device 10 determines if it is connected to a LAN by virtue of detecting whether external power is provided via the docking station 30. Since the portable device 10 will be connected to the LAN via the connectors 26 and 40 at the same time external power is provided, the portable device 10 is able to determine if it is connected to the LAN based on whether external power is detected. Thus, in step 158 the power detection circuit 88 determines whether external power is provided via the power line PWR. If not, it is concluded that the portable device 10 is not connected to the LAN and operation proceeds to step 159 in which the logic circuit 92 places/holds the LAN controller 80 in a sleep mode via the control signal on line 94 as discussed above. Following step 159, the portable device 10 returns to step 158 in order to revaluate whether the portable device 10 has since been connected to the LAN.

Accordingly, upon such time as the portable device 10 is connected to the LAN as determined in step 158 based on the detection of external power on the power line PWR, the operation proceeds to step 160. In step 160, the power detection circuit 88 provides an output signal to the logic circuit 92 which in turn causes the LAN controller 80 to be placed in an active mode via line 94 in order to carry out communications between the portable device 10 and the LAN. In addition to the active signal on line 94, in step 160 the processor 68 is prompted by the logic circuit 92 and a signal on line 155 to provide appropriate initialization signals to the LAN controller 80 via line 82 to ready the LAN controller 80 for operation out of the sleep mode. Such signals are conventional and hence further detail is omitted.

Following step 160, the portable device operation proceeds to step 161 where again the connection to the LAN is reevaluated based on whether external power ID detected. If the portable device 10 is determined as remaining to be connected to the LAN 10 in step 161, the portable device 10 proceeds to step 162 where the LAN controller 80 continues to be held in the active mode via line 94. Following step 162, the system operation returns to step 161. If the portable device 10 is subsequently removed from the docking station 30 as determined in step 161, the portable device 10 will proceed from step 161 to step 159 where the LAN controller 80 is placed into a sleep mode via line 94.

Thus, the present invention provides for a portable device which can be easily connected to a LAN without requiring a PCMCIA card type controller. Furthermore, it is unnecessary to re-boot the device upon connecting the device to a LAN. This provides both convenience and time savings to the user.

Although the invention has been shown and described with respect to certain preferred embodiments, it is obvious that equivalents and modifications will occur to others skilled in the art upon the reading and understanding of the specification. For example, although the connectors 26 and 40 were made up of an array of electrical contacts in the exemplary embodiment, other type connectors could also be used without departing from the scope of the invention. Such connectors may be of the type which also provide a mechanical type connection as well as an electrical connection as will be appreciated.

Also, the portable device 10 is described according to an embodiment in which the portable device 10 is docked in the docking station 30 on its edge 28 in an upright position. It will be appreciated that other arrangements are possible which better facilitate continued user operation of the device 10. For example, the docking station 30 may be designed to connect to the side 28 of the portable device 10 while the portable device 10 is in the horizontal orientation shown in FIG. 1.

Furthermore, it will be appreciated that many of the components included in the portable device 10 as shown in FIG. 3 can be integrated onto one or more integrated circuits. For example, the power detection circuit 88, logic circuit 92 and user input interface 72 could all be combined on a single application specific integrated circuit (ASIC) as represented by dashed line 170.

In addition, the exemplary embodiment utilizes the detection of external power applied to the portable device as being indicative of the portable device being connected to a LAN. However, other techniques for detecting such connection are also considered within the scope of the invention. For example, the LAN controller 80 may be periodically switched from the sleep mode to the active mode to listen for activity on the LAN via lines RD+ and RD−. If activity is detected, the LAN controller 80 remains in the active mode. If activity is not detected for a predetermined period of time, it is determined that the portable device is not connected to the LAN and the LAN controller 80 is placed in the low-power consumption sleep mode. Alternatively, the connector 26 may include a pair of contacts which are shorted together by a corresponding cable connector when used for connecting the portable device 10 to a LAN. By the device 10 including a continuity checking circuit in place of the power detection circuit 88, the LAN controller 80 can be placed in a sleep mode or an active mode based on the detected resistance between the pair of contacts.

The present invention includes all such equivalents and modifications, and is limited only by the scope of the following claims.

What is claimed is:

1. A portable electronic device, comprising:
 a portable housing;
 electronic circuitry within the housing, the electronic circuitry being operable to perform functions independent of and in combination with a system backbone;

an internal area network (LAN) controller within the housing for serving as an interface between the electronic circuitry and the system backbone when the device is electrically connected to the system backbone; and a wireless transceiver serving as an interface between the electronic circuitry and the system backbone when the device is not electrical connected to the backbone.

2. The device of claim 1, wherein the housing includes an externally accessible electrical connector for providing an electrical connection between the LAN controller and the system backbone.

3. The device of claim 2, wherein the electrical connector is configured to provide an electrical connection with a corresponding electrical connector coupled to the system backbone.

4. The device of claim 3, wherein the corresponding electrical connector is included in a docking station designed to receive the device.

5. The device of claim 1, wherein the LAN controller is switchable between an active mode and a low-power consumption sleep mode.

6. The device of claim 5, wherein the LAN controller is automatically placed in the active mode in association with being electrically connected to the system backbone, and is automatically placed in the sleep mode in association with not being electrically connected to the system backbone.

7. The device of claim 5, further comprising a power detection circuit for detecting when external power is provided to the device, and based on such detecting causing the LAN controller to be placed automatically in the active mode in the event external power is provided and causing the LAN controller to be placed automatically in the sleep mode in the event external power is not provided.

8. The device of claim 7, further comprising at least one externally accessible electrical connector for providing an electrical connection between the LAN controller and the system, and for providing an electrical connection between an external power source and the electronic circuitry.

9. The device of claim 8, wherein the at least one electrical connector is configured to provide an electrical connection with a corresponding at least one electrical connector included in a docking station designed to receive the device, the docking station including a connection between the corresponding at least one electrical connector, the system backbone, and the power source which is included in the docking station.

10. The device of claim 1, wherein the device is a portable computer.

11. The device of claim 1, wherein the device is a mobile terminal.

12. A method of using a portable electronic device which includes a portable housing; electronic circuitry within the housing, the electronic circuitry being operable to perform functions independent of and in combination with a system backbone; an internal area network (LAN) controller within the housing for serving as an interface between the electronic circuitry and the system backbone when the device is electrically connected to the system backbone; and an RF transceiver for serving as an interface between the electronic circuitry and the system backbone when the device is not electrically connected to backbone, the method comprising the steps of:

determining whether the device is electrically connected to the system backbone;

placing the LAN controller in an active mode in the event the device is electrically connected to the system backbone; and placing the LAN controller in a low-power consumption sleep mode in the event the device is not electrically connected to the system backbone.

13. The method of claim 12, wherein the determining step includes the step of detecting whether external power is applied to the device, the external power being associated with provision of an electrical connection of the LAN controller to the system backbone.

14. The method of claim 13, wherein the external power and the electrical connection are provided via a docking station configured to receive the device.

15. The method of claim 12, wherein the device is a portable computer.

16. The device of claim 12, wherein the device is a mobile terminal.

17. A method of using a portable electronic device which includes a portable housing; electronic circuitry within the housing, the electronic circuitry being operable to perform functions independent of and in combination with a system backbone; and an internal area network (LAN) controller within the housing for serving as an interface between the electronic circuitry and the system backbone, the method comprising the steps of:

wirelessly exchanging information between the electronic circuitry and the system backbone when the device is not electrically coupled to the backbone; and exchanging communications between the electronic circuitry and the system backbone via the LAN controller when the device is electrically coupled to the backbone.

18. The method of claim 17, wherein a media access layer (MAC) address of the LAN controller is provided by an EEPROM.

19. A portable electronic device, comprising:

a portable housing;

electronic circuitry within the housing, the electronic circuitry being operable to perform functions independent of and in combination with a system backbone;

wherein the electronic circuitry includes a local area network (LAN) controller for serving as an interface between the electronic circuitry and the system backbone when the device is electrically coupled to the system backbone and an RF transceiver for serving as an interface between the electronic circuitry and the system backbone when the device is not electrically coupled to the backbone.

20. A portable electronic device, comprising:

a portable housing;

electronic circuitry within the housing, the electronic circuitry being operable to perform functions independent of and in combination with a system backbone; and a local area network (LAN) controller integrally coupled to said electronic circuitry for serving as an interface between the electronic circuitry and the system backbone when the device is electrically coupled to the system backbone and an RF transceiver for serving as an interface between the electronic circuitry and the system backbone when the device is not electrically coupled to the backbone.

* * * * *